United States Patent [19]
Carlin et al.

[11] 4,068,004
[45] Jan. 10, 1978

[54] SYSTEM AND METHOD FOR COOLING OF GUM BASE

[75] Inventors: Owen Carlin; John E. Beam, both of Norwalk, Conn.; Robert Vermesh, Yonkers, N.Y.

[73] Assignee: Life Savers, Inc., New York, N.Y.

[21] Appl. No.: 701,483

[22] Filed: June 30, 1976

[51] Int. Cl.$^2$ ............................................. A23G 3/30
[52] U.S. Cl. ........................................ 426/3; 426/524
[58] Field of Search ..................................... 426/3–6, 426/524, 113, 114; 62/340, 345, 380, 66; 264/213, 237, 348, 300

[56] References Cited
U.S. PATENT DOCUMENTS

| 3,619,215 | 11/1971 | Bard et al. | 426/113 |
| 3,673,289 | 6/1972 | Gagliani | 264/348 |

Primary Examiner—Jeanette M. Hunter
Attorney, Agent, or Firm—Lawrence S. Levinson; Merle J. Smith; Burton Rodney

[57] ABSTRACT

A system and method are provided for cooling gum base slabs used in the manufacture of chewing gum wherein hot liquid (190°–280° F) gum base is deposited in self-releasing polycarbonate trays, and cooled by chilled air forced in contact with the gum base and the plastic tray until the gum base slab is cooled sufficiently for depanning.

4 Claims, No Drawings

SYSTEM AND METHOD FOR COOLING OF GUM BASE

The present invention relates to a system and method for cooling gum base used in making chewing gum wherein chilled forced air is employed to cool gum base slabs disposed or deposited in self-releasing plastic (preferably polycarbonate) trays.

Gum base is normally manufactured by mixing various gum base ingredients at elevated temperatures and transferring the resulting hot gum base (180°–300° F) into partitioning agent ($CaCO_3$ or talc)-lined steel pans. The steel pans are racked and moved to a cooling area where circulating ambient air is employed to cool the gum base down to below 90° F. The cooling is irregular and takes place over a variable period that ranges from 4 to 10 hours. At the end of the cooling period, the steel trays containing the cooled gum base are unracked, inverted and slammed against a steel grid to separate the gum base from the tray. The operations of precoating of the pans, air circulation cooling, and/or separation of pans and product in the presence of a partitioning agent causes severe dust problems, poor working conditions, and severe housekeeping difficulties. Also, the manual handling operation of filling, racking, unracking and depanning are at best laborious and expensive.

Gum base is preferred in slab or block form even though it is more difficult to cool, because a slab or block offers the warehousing advantages of high density, dimensional stability without retaining container and its very low surface to volume ratio minimizes atmospheric oxidation during storage.

Other release or partitioning agents such as polyethylene, silicones, or waxes, have been tested as a substitute for calcium carbonate in order to avoid the dust problem. However, for various reasons, such substitutes have not been satisfactory and therefore use of calcium carbonate has continued. Due to dust problems, the use of the forced air technique in conjunction with calcium carbonate-lined steel trays has not been commercially feasible.

In an effort to facilitate handling of the trays containing the hot gum base to be cooled, materials lighter than steel, such as aluminum, have been tested. However, such materials have not been able to stand up to the heavy pounding to which the trays must be subjected to release the cooled gum base from the trays.

In accordance with the present invention, a system and method for cooling gum base are provided which overcome or substantially reduce the disadvantages associated with prior art systems and techniques. In one embodiment of the system of the invention, the steel trays or pans are replaced by durable plastic trays which require no release or partitioning agent, and which release cooled slabs after gentle mechanical work rather than vigorous manual labor, and in place of the ambient air cooling technique, means for circulating or flowing cold air, for example at a temperature ranging from 35° to 70° F, at a desired velocity, for example 200 to 2000 ft/min, in contact with the hot gum base disposed in the plastic trays, are employed. With the use of such system, cooling time may be reduced from 4 to 10 hours down to 1½ to 2 hours, while handling problems caused by use of the steel trays and dust problems inherent in the use of calcium carbonate dust are eliminated.

Furthermore, in accordance with the present invention, a method is provided for cooling gum base which method includes the steps of disposing hot gum base in a plastic tray, which tray is preferably formed of a polycarbonate and is free of release or partitioning agents, contacting the hot gum base and tray with cooled air having a temperature ranging from 35° to 70° F and flowing at a velocity of 200 to 2000 ft/min, and after the gum base is cooled, ejecting slabs of gum base from the plastic trays by mechanical flexing and/or thumping of the trays. In a preferred embodiment of the present invention, the air will have a temperature of from about 40° to about 45° F and will be flowing at a velocity of from about 500 to about 1500 ft/min. Under such conditions, the hot gum base, which will normally be at a temperature of between 200° and 250° F, will be sufficiently cooled after 1½ to 2 hours so that the resulting cooled gum base slab may be removed from the plastic tray and packed for warehousing.

In an alternative embodiment of the method of the present invention, a dual cooling technique is employed in combination with the use of the plastic trays wherein hot gum base (over 150° F) is first subjected to the cooling effect of ambient air or even air of slightly elevated temperature (but still at least 50° F below the temperature of the hot gum base) flowing at a velocity of 200 to 2000 ft/min for a period of less than about 1 hour to thereby reduce the temperature of the hot gum base at least 50° and preferably at least 100°–125° F, so that the hot gum base will now be at a temperature of 125°–150° F. Thereafter, the so-cooled gum base (125°–150° F) is contacted with forced chilled air (at a temperature below 70° F) flowing at a velocity of from 200 to 2000 ft/min for a period of from ½ to 2½ hours.

The above two-step cooling technique is advantageous in the significant savings in refrigeration equipment and power requirements.

The actual cooling step may be carried out employing a conventional cooling tunnel wherein plastic trays containing hot gum base may be moved along a conveyor (such as a single or multi-pass) through the cooling tunnel. Alternatively, the tray or trays of hot gum base (racked or otherwise) may be disposed on a stationary support or on a stationary or moving grid, and chilled forced or circulating air may be made to flow into contact with and about the hot gum base.

The cooling tunnel may take the form of a modified continuous wax or chocolate molding machine as manufactured by J. W. Greer, Wilmington, Mass., and Mikrovaerk A/S, Copenhagen, Denmark.

The plastic trays are formed of a polymer or copolymer having high heat resistance, high impact strength and is capable of being formed into a tray having a smooth or polished interior to impart required release properties. The plastic trays are preferably formed of polycarbonate polymer such as bisphenol A polycarbonate as marketed by General Electric Co. under the tradename Lexan. The polycarbonate polymer has high impact strength, dimensional stability, good chemical, corrosion, abrasion and creep resistance, high heat resistance, good hardness and electrical properties, is self-extinguishing, is non-toxic and FDA and USDA approved. Furthermore, the coefficient of thermal expansion of the polycarbonate relative to that of the gum base is favorable so that the gum base upon cooling contracts and moves away from the sides of the polycarbonate tray to assist in easy release. The trays formed of the polycarbonate may be injection molded, compression molded, or shaped by other conventional thermoforming methods and machined. The polycarbonate resin is preferred to be molded with a smooth interior face to facilitate release of the gum base and, in fact, may be molded with a hard glass (smooth microglass-like) finish.

Another important advantage obtained in using the plastic trays, such as polycarbonate trays, over the conventional steel trays is that when calcium carbonate partitioning agent is not required, there can be direct heat transfer from the hot gum base through the plastic tray to facilitate cooling; where the calcium carbonate is employed the layer of calcium carbonate has been found to inhibit or act as an insulator to heat transfer thereby contributing to the long cooling time normally required when using the calcium carbonate-lined steel trays.

The plastic tray will be both durable and flexible so that the tray may be slightly twisted, compressed or otherwise maneuvered and only lightly thumped to cause the cooled gum base slab to "pop" out from the tray.

In another aspect of the present invention, the prior art process and system as described above are modified by replacing the calcium carbonate lined-steel trays with the polycarbonate tray discussed above. In this way, although the actual cooling time is not substantially reduced, still, the prior art technique (of merely allowing ambient air to contact the hot gum base) is substantially improved by the fact that the calcium carbonate dust problem and corrosion and labor-handling problems associated with the use of steel pans are eliminated.

It will be appreciated that all of the above methods according to the present invention may be carried out on a batch or a continuous basis.

The tray may be of any desired configuration although it is preferred that it be rectangular with slightly sloping sides wherein the sides slope inwardly toward the bottom of the tray; furthermore, the tray will preferably have rounded bottom and side edges to facilitate release of the cooled gum base slab therefrom.

The actual design details of the tray are based upon cooling-conveyor requirements and dimensions, warehouse palletizing dimensions and other practices employed by those proficient in tray design to facilitate the release, strength and sanitary aspects of cast food products.

The following Example represents a preferred embodiment of the present invention.

EXAMPLE

Hot gum base is deposited into polycarbonate trays or pans until a layer of gun base 1 to 1½ inches is deposited. The polycarbonate tray is of the following design:
- 16 inches × 22 inches × 3 inches max overall dimension including ⅜ inch lip;
- angle formed by bottom and sides (all) = 115°;
- radius of joint between bottom and sides (all) = ½ inch;
- radius of joint at corners (all) = 1 inch;
- thickness of polycarbonate = 0.115 to 0.125 inches;
- overall outside height of pan should not exceed 3 inches;
- interior of pans is smooth.

The trays holding the hot gum base are disposed on a moving roller-chain conveyor and passed into a cooling tunnel of the type described as the Greer Multi-tier Automatic Wax Moulding Machine, J. W. Greer, Inc., Hudson, N.H. The cooling tunnel includes a continuously moving tray-type conveyor which is made to travel through a twelve tier circuit during which time cooling is effected by refrigerated (~40° F) forced air circulation (500 ft/min). The residence time required in the cooling tunnel is about 90 minutes.

After cooling, the polycarbonate trays containing the cooled gum base are passed to a demolding station in an inverted position. The cooled gum base slabs are ejected from the trays by mechanical flexing and thumping.

COMPARATIVE EXAMPLE

Finished hot (~250° F) gum base is transferred from sigma blade mixers to converters (jacketed holding tanks) and thence into partitioned steel pans for the purpose of cooling and molding into blocks. The pans are loaded on to shelved racks and these are moved in an area designated for cooling. Cooling takes place over about a 6-hour period. Inside ambient air is circulated by fans to facilitate cooling.

At the end of the cooling period the base, which is now a solid, has a temperature of 90° F or below. The base is removed from the pans at the "Knocking" station. Here the operators withdraw the pans from the racks, lift, invert, and then slam the full pans on a steel grid to separate the base from the pan.

What is claimed is:

1. A method for rapidly cooling hot gum base, which comprises disposing hot gum base at a temperature of over 150° F in a plastic tray formed of high heat resistant, high impact strength self-releasing polycarbonate polymer or copolymer and substantially free of release agent or partitioning agent so that direct heat transfer may be effected from the hot gum base through the polycarbonate tray to facilitate cooling, and contacting the hot gum base with forced chilled air at a temperature of below 70° F flowing at a velocity of from 200 to 2000 ft/min, for a period of at least 1 hour and less than 3 hours, and after the gum base has cooled ejecting the cooled gum base slab from the plastic tray by relatively gentle mechanical working.

2. The method as defined in claim 1 wherein said plastic tray is formed of a polycarbonate.

3. The method as defined in claim 1, prior to contacting the hot gum base with forced chilled air, further including the step of contacting the hot gum base (at a temperature over 150° F) with ambient air or air of slightly elevated temperature (but still at least 50° F below the temperature of the hot gum base) and flowing at a velocity of 200 to 2000 ft/min for a period of less than about one hour.

4. In a method for cooling a hot gum base including the steps of disposing the hot gum base in a steel tray lined with calcium carbonate or talc partitioning agent, and subjecting the hot gum base to the cooling effect of ambient air, the improvement which comprises replacing the steel tray lined with calcium carbonate or talc with self-releasing polycarbonate trays free of release or partitioning agent to facilitate removal of cooled gum base from the polycarbonate trays.

* * * * *